United States Patent [19]

Ruehle

[11] 4,382,486

[45] May 10, 1983

[54] TUNED AIR GUN ARRAY

[75] Inventor: William H. Ruehle, Duncanville, Tex.

[73] Assignee: Mobil Oil Corporation, New York, N.Y.

[21] Appl. No.: 231,717

[22] Filed: Feb. 5, 1981

[51] Int. Cl.³ .......................... G01V 1/34; G01V 1/38
[52] U.S. Cl. ...................................... 181/118; 367/23; 367/144; 181/115
[58] Field of Search ............... 181/110, 111, 115, 118, 181/120; 367/23, 144

[56] References Cited

U.S. PATENT DOCUMENTS

| | | | |
|---|---|---|---|
| Re. 23,552 | 9/1952 | Babb et al. | 177/352 |
| 3,437,170 | 4/1969 | Brock et al. | 181/5 |
| 3,460,064 | 8/1969 | Giles et al. | 181/120 |
| 3,602,878 | 8/1971 | Sullivan | 367/144 |
| 3,893,539 | 7/1975 | Mott-Smith | 181/115 |
| 4,064,479 | 12/1977 | Ruehle | 181/110 |
| 4,146,871 | 3/1979 | Ruehle | 181/120 |

FOREIGN PATENT DOCUMENTS

| | | | |
|---|---|---|---|
| 1542261 | 3/1979 | United Kingdom | 181/118 |
| 2062227 | 5/1981 | United Kingdom | 181/118 |

OTHER PUBLICATIONS

Kologinczak, "STAGARAY System . . . Marine Exploration", 5/8/74, pp. 801–808, OTC 2020.
Bransaeter et al., "A New . . . Air Gun Array", 5/79, pp. 865–879, Geophysics, vol. 44, & 5.
Ziolkowski, "Design of . . . Air Guns . . .", 1971, pp. 499–530, Geophys. J. R. Astr. Soc.

Primary Examiner—Nelson Moskowitz
Attorney, Agent, or Firm—C. A. Huggett; M. G. Gilman; F. J. Kowalski

[57] ABSTRACT

The present invention provides a method for determining the spacing and size of air guns in a tuned air gun array. Volume ratios are calculated based upon a predetermined maximum volume for any individual air gun. The volumes are cross-referenced to spacings for optimum air gun interaction. The resulting air gun array operates as a broadband high-energy point source.

3 Claims, 2 Drawing Figures

$$VR_n = (VR_o)^{K(1 - \frac{n}{N-1})^P}$$

$$K < (1 - \frac{1}{N-1})^{-P}$$

TUNED AIR GUN ARRAY

The present invention relates to undersea seismic pulse generation systems, and more particularly to air gun type seismic pulse generators comprising a new high pressure tuned air gun array which will operate as a broad band high energy point source. In undersea seismic exploration an air gun source system is normally used in conjunction with a string of geophone receivers towed behind a seismic exploration vessel. The seismic pulse sources suddenly release high pressure air which generates radiated energy directed at the ocean floor. The geophones being towed behind the seismic exploration vessel detect this radiated energy when it is reflected from subocean floor formation interface changes. In addition to the reflected energy, the geophones will also detect refracted energy carried along the ocean floor prior to emerging on a path toward the geophone as well as acoustical noise and direct arrivals from the seismic pulse source which have not reflected off subsea formations but have radiated directly to the string of geophones.

In implementing an air gun source system one of the prime considerations is maximization of the total radiated energy as measured by the peak pressure amplitude of the source signature. This is critical when one considers the complete seismic system. In analyzing seismic system dynamic range specifications, one must consider the source as one block of the system. Effective system dynamic range can be increased for all non-source generated noise, such as transmission losses and environmental noise, by simply increasing the source size. The maximum radiated energy of an air gun system is achieved by using small equal volume air guns at the highest acceptable pressure. The minimum volume one uses is determined by the pulse spectrum that is acceptable. However, when using equal volume air guns, a major component of the radiated signal is the bubble oscillations. Although these oscillations are objectionable in both structural and detail mapping, they are acceptably suppressed by spiking deconvolution and in theory, completely removed by signature deconvolution. It should be noted that the deconvolution procedure is effective in a very noise free system, however, this deconvolution performance cannot be expected on a seismic trace from field exploration in a noisy atmosphere.

SUMMARY OF THE INVENTION

The present invention includes a method for providing a high pressure tuned air gun array which operates as a broadband high energy point source. The method of the present invention determines the size of air guns based upon a maximum gun size. The ratio between the maximum gun size and the smallest gun size is set at a predetermined constant. Volume choice is made so constructive interference between bubble oscillations does not occur. Choice of volumes may be further determined by maximum total volume of pressurized air available.

DESCRIPTION OF THE PREFERRED EMBODIMENT

Figure 1:
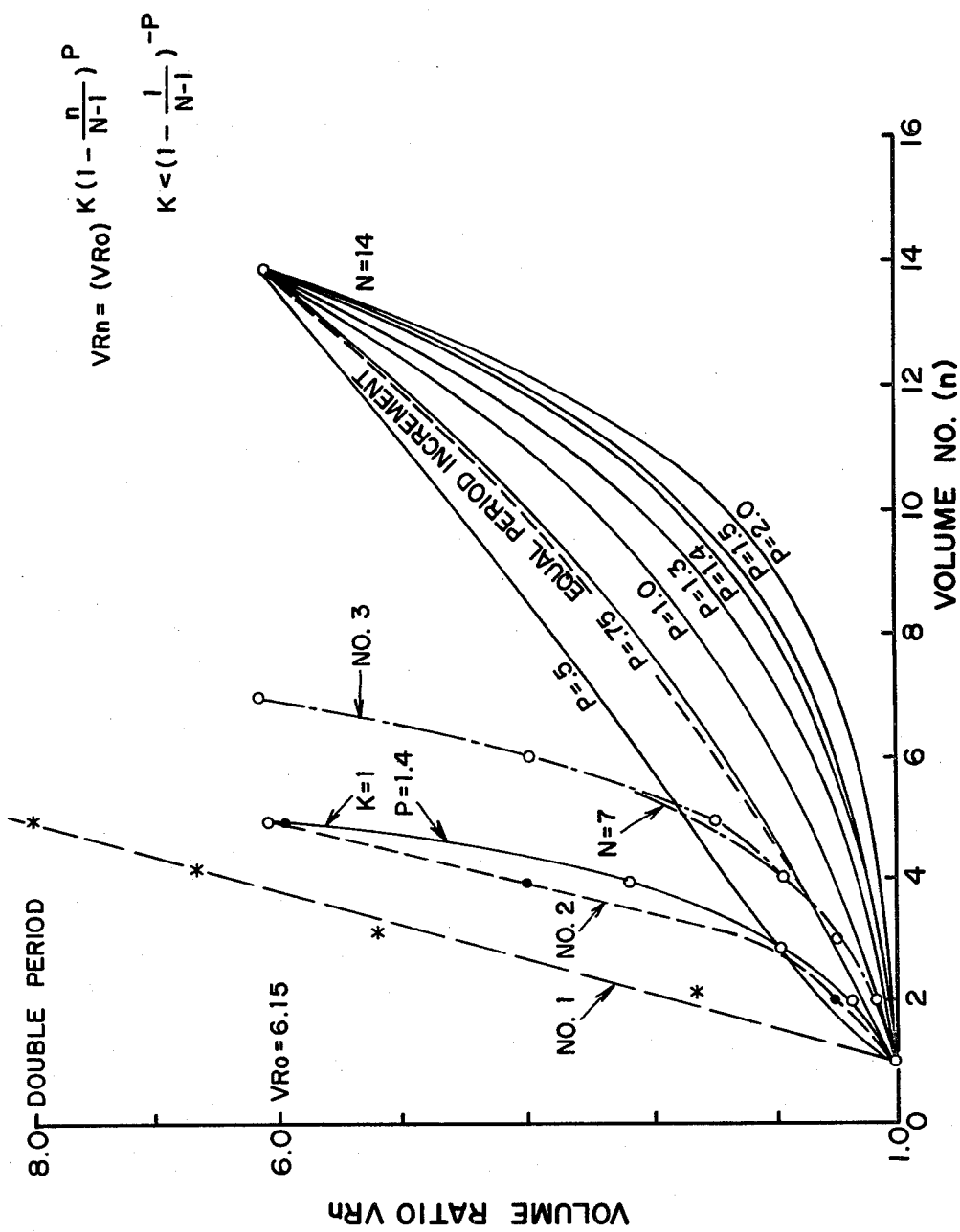
FIG. 1 is a graphical representation of air gun volumes.

Air gun arrays for marine seismic exploration have significant problems with acoustic noise. Often, the acoustic noise will distort recorded seismic reflection data to mask reflection events. A primary source of acoustic noise is bubble oscillations and their interaction may be removed by "tuning" an air gun array. By "tuning" an air gun array is meant combining different volume air guns into an array when individual air volumes have no interaction and the overall array dimensions are small enough to constitute a point source having reduced bubble oscillations.

Array tuning may be accomplished by altering volumes of air guns due to the physical properties of two oscillating bubbles of gas which obey the relationships $$\frac{T_2}{T_1} \alpha \frac{A_2}{A_1} \alpha \frac{D_2}{D_1} \alpha \left(\frac{V_2}{V_1}\right)^{\frac{1}{3}}$$

where
T = bubble period
A = pressure pulse amplitude
D = distance for bubble independence
V = air gun volume After a series of simulations it became apparent that improved tuning on debubbling occurred for a distribution of air volumes wherein:
$1 < V_i/V_1 < 8$ and wherein $V_i$ is aperiodic where $V_1$ is the smallest air gun volume.

Thus the magnitude of the bubble period, pressure pulse amplitude and distance for bubble independence for larger guns will be greater, but less than twice that of the smallest gun.

Bubble oscillation period is related to gun chamber pressure, gun chamber volume and hydrostatic pressure as follows:

$$T = \frac{(Pc\, Vc)^{\frac{1}{3}}}{46.1(Po)^{5/6}}$$

where:
T = oscillation period in seconds
Pc = gun chamber pressure in psia
Vc = gun chamber volume in in$^3$
Po = hydrostatic pressure in psia The period equation for a oscillation bubble of potential energy E is $$T = \frac{C(E)^{\frac{1}{3}}}{(d + 33)^{5/6}}$$

where d = depth to bubble center.
Where gun pressure and depth are constant, $$T \alpha Vc^{\frac{1}{3}}$$

thus, $$\frac{T_2}{T_1} = \left(\frac{Vc_2}{1Vc}\right)^{\frac{1}{3}}$$

which relates to periods of two different volume guns. From this relationship the limiting volumes for a tuned air gun array may be calculated.

The pulse amplitude may be similarly derived resulting in $$A \alpha V^{\frac{1}{3}}$$

thus $$\frac{A_2}{A_1} = \left(\frac{V_2}{V_1}\right)^{\frac{1}{3}}$$

The relationship between pulse amplitude and gun pressure has been determined experimentally to be $$A \alpha P$$

Experimental data further demonstrates that the distance for acceptable non-interaction between air guns, (that is less than 10% period increase) where the air guns appear as individual point sources, is given by the equation $$D \alpha (PV)^{\frac{1}{2}}$$

and where pressures are equal $$\frac{D_2}{D_1} = \left(\frac{V_2}{V_1}\right)^{\frac{1}{2}}$$

From these equations the distance for non-interaction of other gun volumes may be derived.

The procedure for tuning an array of air guns to produce a simple high amplitude bubbleless source consists of selecting air guns of different volumes and spacing them so they do not interact. A ghost time of 35 feet, 0.014 seconds, is chosen as the time increment reduction on the period for the largest gun since it will hold for a number of volumes larger than four and will be insensitive to small changes in depth of source. For the purposes of example, the preferred embodiment is constructed from 150 in³ air guns, however, any size air gun may be used in the method of the present invention.

A 150 in³ volume air gun at 30 feet and 2000 psi has a bubble period of 0.083 sec as determined by computer simulation and verified by experiment.

Since $$\frac{V_2}{V_1} = \left(\frac{T_2}{T_1}\right)^3$$

to obtain the largest volume gun which may be used $$\frac{V_2}{V_1} = \frac{[2(.083) - .014]^3}{(.083)^3}$$

$$\frac{V_2}{V_1} = 6.1$$

$$V_2 = 6.1(150) = 915 \text{ in}^3$$

Twice the period of the smallest gun was determined by $$\frac{T_2}{T_1} \alpha \left(\frac{V_2}{V_1}\right)^{\frac{1}{3}} \text{ since } \frac{V_2}{V_1} > 8 \frac{V_2}{V_1} = \frac{8}{1} \text{ and}$$

$$\frac{T_2}{T_1} = \frac{2}{1} T_2 = 2T_1$$

$T_2=2T_1$—ghost time satisfies this requirement and establishes the period for the largest gun. Based upon the computed volume ratio between the largest volume and the smallest volume, air guns whose volume ratios are within the range of one to six point one are used.

Additional volumes may be selected to distribute first bubble oscillation between $T_1$ and $1.083T$, or may be selected at increments of $(0.083)/(N-1)$ for N volumes. The ghost interval is selected for evenly spaced periods. For N=6, the period separation is at the ghost interval for 35 feet.

From the equation $$A \alpha \sum_i V_i^{\frac{1}{3}}$$

it is implied that for a fixed air capacity, a higher pressure pulse amplitude is obtained by distributing the air capacity to a number of volumes rather than by using the air capacity in a single large volume air gun.

A table of various ratios for designated numbers of guns are indicated in Table 1. The total number of guns is terminated at 13, assuming an air supply having a maximum capacity of 6000 in³ at 2000 psi at 8 sec. cycle. The sum of the ratios multiplied by the minimum gun size of 150 in³ exceeds the maximum capacity.

TABLE I

| N | Air Gun Volume Ratios | $\left(\frac{(N-1) + n\left(\frac{.069}{.083}\right)^3}{N-1}\right)$ |
|---|---|---|
| 3 | 1,2.83,6.15 | |
| 4 | 1,2.08,3.75,6.15 | |
| 5 | 1,1.76,2.83,4.27,6.15 | |
| 6 | 1,1.59,2.36,3.36,4.61,6.15 | |
| 7 | 1,1.47,2.88,2.83,3.75,4.84,6.15 | |
| 8 | 1,1.4,1.89,2.49,3.2,4.04,5.01,6.15 | |
| 9 | 1,1.34,1.76,2.25,2.83,3.5,4.27,5.14,6.15 | |
| 10 | 1,1.3,1.66,2.08,2.57,3.12,3.75,4.46,5.25,6.15 | |
| 11 | 1,1.27,1.59,1.95,2.36,2.83,3.36,3.95,4.61,5.33,6.15 | |
| 12 | 1,1.24,1.52,1.84,2.21,2.61,3.07,3.57,4.12,4.73,5.4,6.15 | |
| 13 | 1,1.22,1.48,1.76,2.08,2.44,2.83,3.27,3.75,4.27,4.84,5.46,6.15 | |

Table 2 gives the debubbling ratio for all cases listed in Table 1 and is determined by computer simulation which may be any method well known in the art. The debubbling ratio provides a means of choosing between the selection procedures on the basic array efficiency in yielding a given bubble suppression. The most efficient debubbling ratio with equiperiod selection of air gun volume occurs at six volumes which corresponds to that for period increments equal to the ghost period.

TABLE II

| N | Total Volume | $P_A$ | $P_B$ | $P_A/P_B$ | Debubbling Ratio Volume |
|---|---|---|---|---|---|
| 3 | 1490 | 14.642 | 4.036 | 3.63 | $2.44 \times 10^{-3}$ |
| 4 | 1939 | 20.858 | 3.859 | 5.41 | $2.79 \times 10^{-3}$ |
| 5 | 2393 | 26.070 | 3.742 | 6.97 | $2.91 \times 10^{-3}$ |
| 6 | 2854 | 31.301 | 3.607 | 8.68 | $3.04 \times 10^{-3}$ |

TABLE II-continued

| N | Total Volume | $P_A$ | $P_B$ | $P_A/P_B$ | Debubbling Ratio Volume |
|---|---|---|---|---|---|
| 7 | 3311 | 36.506 | 3.776 | 9.67 | $2.92 \times 10^{-3}$ |
| 8 | 3771 | 41.728 | 3.929 | 10.02 | $2.82 \times 10^{-3}$ |
| 9 | 4231 | 46.946 | 4.090 | 11.48 | $2.71 \times 10^{-3}$ |
| 10 | 4701 | 52.172 | 4.261 | 12.24 | $2.60 \times 10^{-3}$ |
| 11 | 5157 | 57.398 | 4.467 | 12.85 | $2.49 \times 10^{-3}$ |
| 12 | 5614 | 62.598 | 4.711 | 13.29 | $2.37 \times 10^{-3}$ |
| 13 | 6077 | 67.827 | 4.963 | 13.67 | $2.25 \times 10^{-3}$ |

As indicated in the formula $$A = \Sigma(V)^{\frac{1}{3}} \times C$$

for a fixed air capacity, a higher pressure pulse amplitude is obtained by distributing the air capacity to a number of volumes rather than by using the air capacity in a single large volume gun. The results of Table 2 indicate that to produce a desired bubble suppression a large number of small volume air guns of slightly differing volumes should be selected. A further requirement is that the bubble period is distributed over a range Tmin (minimum period) to Tmax (maximum period) with volume selection requiring that the bubble period be closer together near the Tmin boundary.

The following equation has the property of establishing volume ratios which have different volumes having bubble periods distributed over a Tmin to Tmax range.

$$V_{rn} = (V_{ro})^{K(1 - \frac{n}{N-1})^P}$$

where
N = number of volumes
Vrn = volume ratio corresponding to the index n
n = 1, ... N−1
Vro = largest volume ratio
K = constant
P, parameter ≧ 0.76
Vro, as previously indicated, is to be less than eight.
K is less than $$\left(1 - \frac{1}{N-1}\right)^{-P}$$

FIG. 1 is a graphical representation illustrating Vrn for N = 14, K = 1, Vro = 6.15 and various values for P. The case for equal period increments is given as a dashed line and approximates P = 0.76.

Table III gives the ratios of the air guns calculated according to the equation:

$$V_{rn} = (V_{ro})^{K(1 - \frac{n}{N-1})^P}$$

Also illustrated are graphical representations identified as No. 1, No. 2 and No. 3 which are values for prior art air gun arrays.

TABLE III

| N | K = 1, P = 1.4 VR$_o$ = 6.15 |
|---|---|
| 4 | 1,1.42,2.68,6.1 |
| 5 | 1,1.25,1.90,6.1 |
| 6 | 1,1.18,1.58,2.32,3.65,6.1 |
| 7 | 1,1.13,1.42,1.92,2.68,3.96,6.1 |
| 8 | 1,1.1,1.32,1.66,2.18,2.96,4.2,6.1 |

TABLE III-continued

| N | K = 1, P = 1.4 VR$_o$ = 6.15 |
|---|---|
| 9 | 1,1.08,1.25,1.51,1.9,2.44,3.24,4.39,6.1 |
| 10 | 1,1.07,1.21,1.42,1.71,2.11,2.68,3.46,4.55,6.1 |
| 11 | 1,1.06,1.18,1.35,1.58,1.90,2.32,2.88,3.65,4.68,6.1 |
| 12 | 1,1.05,1.15,1.29,1.49,1.74,2.07,2.5,3.07,3.81,4.79,6.1 |
| 13 | 1,1.04,1.13,1.25,1.42,1.63,1.9,2.24,2.68,3.24,3.96,4.89,6.1 |
| 14 | 1,1.04,1.12,1.22,1.36,1.54,1.76,2.04,2.39,2.83,3.39,4.09,4.96,6.1 |
| 15 | 1,1.04,1.1,1.2,1.32,1.47,1.66,1.9,2.18,2.54,2.98,3.52,4.2,5.04,6.1 |

Table IV gives the debubbling ratio of the airgun arrays of Table III. As can be seen by a comparison of debubbling ratios, the method of the present invention gives superior results in removing noise distortion caused by bubble oscillations.

Figure 2:
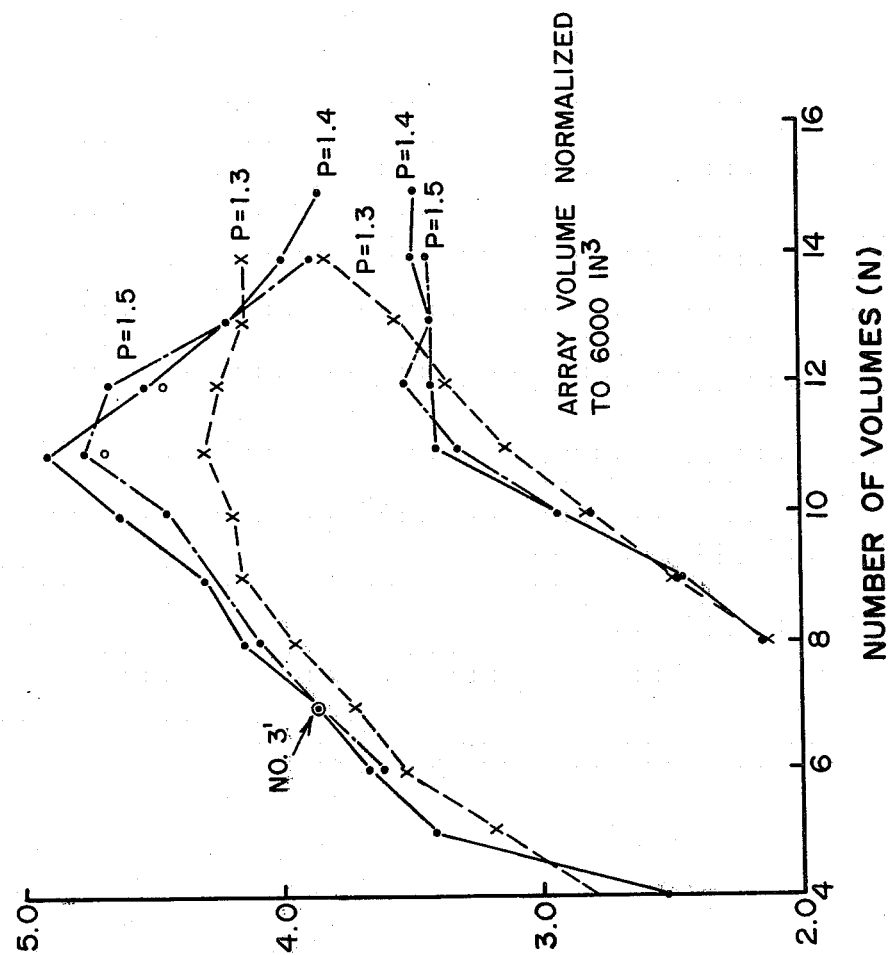
FIG. 2 is a graphical illustration of debubbling efficiency for the cases described in Tables 2 and 4.

FIG. 2 is a graphical representation illustrating the debubbling ratios calculated in Tables II and IV.

TABLE IV

| N | Total Volume (1) | $P_A$ | $P_B$ | Ratio of Primary Pulse to Bubble Pulse (2) | (Debubble Ratio) Volume (2)/(1) |
|---|---|---|---|---|---|
| 4 | 2082 | 19.691 | 3.748 | 5.25 | $2.52 \times 10^{-3}$ |
| 5 | 2024 | 24.423 | 3.538 | 6.90 | $3.41 \times 10^{-3}$ |
| 6 | 2375 | 29.172 | 3.349 | 8.71 | $3.67 \times 10^{-3}$ |
| 7 | 2728 | 33.936 | 3.180 | 10.67 | $3.91 \times 10^{-3}$ |
| 8 | 3078 | 38.666 | 12.780 | 12.78 | $4.15 \times 10^{-3}$ |
| 9 | 3436 | 43.443 | 2.951 | 14.72 | $4.28 \times 10^{-3}$ |
| 10 | 3796 | 48.231 | 2.738 | 17.62 | $4.64 \times 10^{-3}$ |
| 11 | 4155 | 53.003 | 2.601 | 20.38 | $4.905 \times 10^{-3}$ |
| 12 | 4509 | 57.755 | 2.819 | 20.49 | $4.54 \times 10^{-3}$ |
| 13 | 4872 | 62.542 | 3.043 | 20.55 | $4.22 \times 10^{-3}$ |
| 14 | 5227 | 67.284 | 3.203 | 21.01 | $4.02 \times 10^{-3}$ |
| 15 | 5423 | 72.049 | 3.444 | 20.92 | $3.86 \times 10^{-3}$ |

While the present invention has been described by way of the foregoing preferred embodiment, it is to be understood that the preferred embodiment is for illustration only and the present invention should not be limited thereto but only by the scope of the appended claims.

What is claimed is:

1. A method of selecting volume ratios of air guns spaced apart in a seismic exploration array comprising the steps of:

selecting the largest individual volume of the desired array;

selecting the total number of air guns in the array;

determining the volume ratio for individual guns according to the equation $$V_{rn} = (V_{ro})^{K(1 - \frac{n}{N-1})^P}$$

where
   N = said number of volumes
   Vr = the volume ratio corresponding to the index n
   n = 1, ... N−1
   Vro < 8 = largest volume ratio $$K = \text{constant} < \left(1 - \frac{1}{N-1}\right)^{-P}$$

P = parameter > 0.76.

2. The method according to claim 1 also including the step of determining the distance between air guns according to the equation $$D = (P_s V)^{\frac{1}{3}}$$

where
D = distance between guns
$P_s$ = pressure of the air gun
V = volume of the air gun.

3. The method according to claim 1 wherein said step of selecting the largest individual volume includes determining the largest volume according to the equation $$\frac{V_2}{V_1} = \frac{[2(BP) - GT]^3}{(BP)^3}$$

where
$V_1$ = smallest gun volume
$V_2$ = largest gun volume
BP = bubble period
GT = ghost time.

* * * * *